Patented Mar. 15, 1938

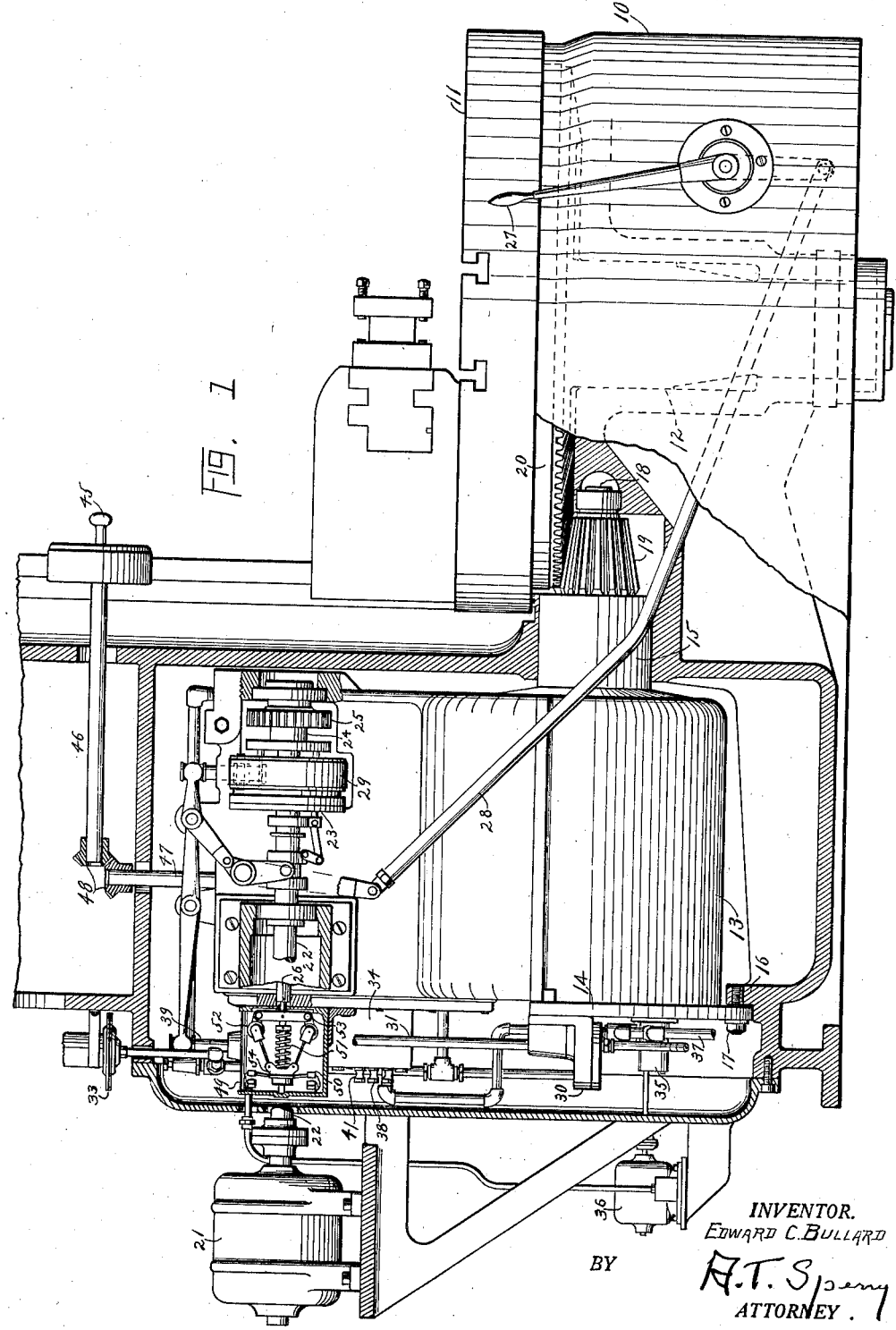

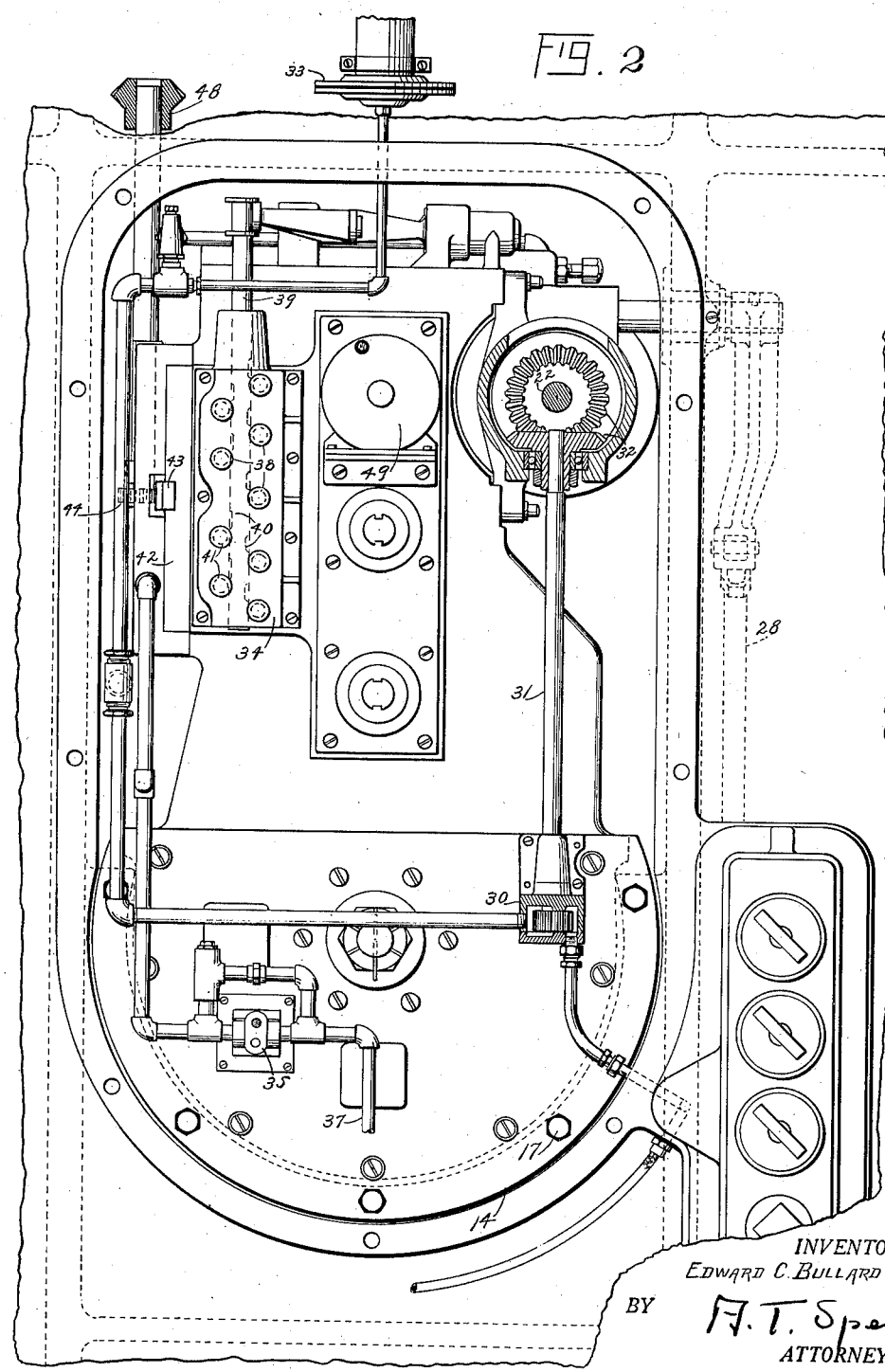

2,111,355

UNITED STATES PATENT OFFICE 2,111,355

MACHINE TOOL SPEED CHANGE MECHANISM

Edward C. Bullard, Fairfield, Conn., assignor to The Bullard Company, a corporation of Connecticut Application February 27, 1937, Serial No. 128,096

15 Claims. (Cl. 29—29)

This invention relates to machine tool speed change mechanisms and, more particularly, to hydraulically-operated speed change mechanisms for association with machine tools of the lathe, or boring mill, type.

Among the general objects of this invention is to provide a novel, simple and efficient means to automatically control pressure delivery to a gear selector of an hydraulic speed change mechanism.

One of the more specific objects is to provide a control for fluid pressure delivered to a gear selector so as to allow an easy gear preselection and avoid the application of a pressure to the selector valve that might cause binding or otherwise become an obstacle to the ease of selector manipulation.

Another object is to supply pressure only when the transmission gears are at rest, thus avoiding danger of shifting the gears, while the machine is in motion, leading to gear clashing, breaking of gears or damaging the machine.

Another object is to provide in a machine, the combination of mechanical and electrical means to supply fluid pressure to the selector only at such times as it is desired to shift the gears.

A further object is to make use of a separate fluid means to supply pressure to a gear selector, independent of the lubricating system of the machine, and free from the variations in pressure and interruptions that may result from the use of the lubricating system.

Another object is to provide a speed change mechanism that will be economical in the use of oil and power by the periodical operation of the fluid pressure means.

The invention is illustrated in combination with a speed change selector incorporated in a large, single spindle, boring mill and is an improvement in the headstock unit disclosed in the Bullard patent, No. 1,970,277, and the gear shifting control mechanism disclosed in the Bullard patent, No. 2,058,294.

This invention is concerned chiefly with the applying and relieving of the fluid pressure to a gear selector allowing free movement of the selector valve prior to such time as it is desired to shift gears.

In the change speed gear mechanism of the type disclosed in the patents referred to, a preselection of gear changes may be made. The desired changes may be selected on a dial in advance and, when the spindle is at rest, the changes will be made automatically.

The gears are shifted by means of levers operated by pistons in a selector under the influence of fluid pressure. It is desirable to have the fluid pressure to move the pistons applied only when the main clutch is disengaged and the gears are being shifted. To accomplish this, there is provided a fluid pump operated by a motor which is controlled in conjunction with the main clutch.

The above general description discloses but one specific adaptation of the invention and it will be understood that it is not confined to the specific structural elements shown. In describing this invention, reference is made to the accompanying drawings forming part of this application in which:

Figure 1 is a side elevation of a machine tool, partly in section, showing the main clutch, centrifugal switch, pump, etc.; and Figure 2 is an enlarged end view showing the gear selector, pump and related parts.

In referring to the drawings, the invention is shown as applied to a machine of the single spindle boring mill type. The machine comprises a base 10 supporting a work table 11 in a bearing 12. Rearwardly of the table 11, a headstock, comprising a housing 13, is removably mounted. The rear of the housing 13 is supplied with a flange 14 and its forward end with a cylindrical extension 15 resting in a conforming portion of the base 10. The flange 14 is bolted to a corresponding flange 16 of the base 10, as by bolts 17, securely holding the housing 13 in place. The forward end of a shaft 18 carries a table pinion 19 meshing with a table gear 20 on the underside of the table 11. The machine is operated by a main drive, continuously running, motor 21 suitably mounted at the rear of the machine. Power from the motor 21 is transmitted to the headstock by a shaft 22 and a clutch 23 to a sleeve 24 having thereon a gear 25 meshing with a corresponding gear, not shown, on a primary shaft 26 in the upper part of the headstock. Manual means, in the form of a hand lever 27 associated with connecting links 28, are conveniently located for the operator to manipulate the main clutch 23 to start, or stop, the machine. Incorporated with the clutch 23 are braking means 29 to retard the momentum of the gears and bring the machine quickly to rest.

Oil for lubricating the headstock is supplied by a geared pump 30 driven by a shaft 31 through bevel gears 32 from the continuously running motor shaft 22. Associated with the lubricating system is a pressure switch 33 capable of stopping the machine on failure of the oil pressure.

The hydraulic gear selector, generally designated at 34, is more fully illustrated in the headstock unit, Patent No. 1,970,277, and the gear shifting control mechanism, Patent No. 2,058,294. Fluid pressure is supplied to the selector 34, when required, by a geared pump 35 operated by a pump motor 36. Fluid may be supplied to the pump 35 either from the lubricating oil supply or from a separate source, not shown, through the medium of a pipe 37. Numerous rods in the selector, the ends designated by number 38 operable by pistons actuated by fluid pressure, are provided with gear shifting forks to shift sliding gears in the headstock, these parts being clearly shown in the above mentioned patents. Suitable interlocking means may be provided by a rod 39 having notches 40 corresponding to recesses 41 in the shifter rods 38. Associated with the gear shifting rods 38 is a valve plate 42, slidably operable by a rack 43 and pinion 44.

A desired gear ratio between the primary shaft 26 and the table pinion shaft 18 may be preselected by rotation of a selector control knob 45 to a predetermined position. Rotation of the control knob 45 will move the valve plate 42 by means of shafts 46 and 47, acting through a pair of bevel gears 48, to a position to control the admission of fluid pressure to certain pistons to shift the gears to the proper relation to produce the predetermined gear ratio, the actual shifting of the gears to provide the desired speed ratio being performed by fluid pressure supplied to the selector by the pump 35. The pump 35 is operated by the motor 36 controlled by a centrifugal switch 49 operated by the primary shaft 26 in the headstock. When the primary shaft 26 is stationary, contacts 50, urged by a spring 51, form a completed circuit through adjacent contacts to operate the motor 36. Manual operation of the lever 27 to engage the clutch 23 will start rotation of the gear 25 and drive the primary shaft 26. Rotation of the primary shaft 26 will cause weights 52, hinged at 53, to fly out due to centrifugal force and retract a contact holder 54 against pressure of the spring 51 breaking contacts 50, thus stopping the motor 36.

In operating the machine, the operator first turns the knob 45 to the position to produce the desired table speed, the main motor 21 having been energized causing the shaft 22 to revolve; the clutch 23 being disengaged, the sleeve 24 remains idle, closing the centrifugal switch 49 and energizing the pump motor 36, thereby supplying fluid pressure to the selector 34 and thus moving the gears to the desired preselected position. Actuation of the lever to engage the clutch 23 will cause the sleeve 24 to revolve, rotating the shaft 26 through the gear 25, thus opening the centrifugal switch 49, stopping the pump motor 36 and thereby relieving the pressure on the selector 34. While the machine is running, the valve plate 42 being relieved of pressure, a new selection of speed may be easily made by turning the knob 45.

From the foregoing it will be seen that the present invention provides a simple, reliable and economical means for permitting the preselection of speed changes in a change gear mechanism and the automatic shifting of the gears upon the disengagement of the main clutch. It will be understood, of course, that the invention is not limited to the structural details described herein and that it is susceptible of various modifications and adaptations within the scope of the appended claims.

Having set forth the nature of my invention, what I claim is:

1. In a machine tool headstock, including an hydraulically-actuated speed selector, a shiftable speed selector valve settable to cause the selection of predetermined speeds upon the application of pressure to said valve and means for delivering fluid pressure to said valve, said means including a pump controlled by actuation of the headstock.

2. In a machine tool headstock, including an hydraulically-actuated speed selector, a shiftable speed selector valve settable to cause the selection of predetermined speeds upon the application of pressure to said valve and means for delivering fluid pressure to said valve, said means including a pump actuated by a motor controlled by actuation of the headstock.

3. In a machine tool headstock, including an hydraulically-actuated speed selector, a shiftable speed selector valve settable to cause the selection of predetermined speeds upon the application of pressure to said valve and means for delivering fluid pressure to said valve, said means including a pump actuated by a motor, and means controlled by said headstock to actuate said pump by said motor.

4. In a machine tool headstock, including an hydraulically-actuated speed selector, a shiftable speed selector valve settable to cause the selection of predetermined speeds upon the application of pressure to said valve and means for delivering fluid pressure to said valve, said means including a pump actuated by a motor, and means controlled by said headstock to actuate said pump by said motor, said means including a motor control device.

5. In a machine tool headstock, including an hydraulically-actuated speed selector, a shiftable speed selector valve settable to cause the selection of predetermined speeds upon the application of pressure to said valve and means for delivering fluid pressure to said valve, said means including a pump actuated by a motor, and means controlled by said headstock to actuate said pump by said motor, said means including a centrifugally-responsive device.

6. In a machine tool headstock, including an hydraulically-actuated speed selector, a source of power for the headstock, a main clutch therefor, a selector valve movable to various positions in order to select the desired speed and means for delivering fluid pressure to said valve, said means including a pump controlled by the actuation of the clutch.

7. In a machine tool headstock, including an hydraulically-actuated speed selector, a source of power for the headstock, a main clutch therefor, a selector valve movable to various positions in order to select the desired speed and means for delivering fluid pressure to said valve, said means including a pump actuated by a motor controlled by the actuation of the clutch.

8. In a machine tool headstock, including an hydraulically-actuated speed selector, a source of power for the headstock, a main clutch therefor, a selector valve movable to various positions in order to select the desired speed and means for delivering fluid pressure to said valve, said means including a pump actuated by a motor, and means controlled by said clutch to actuate said pump by said motor.

9. In a machine tool headstock, including an hydraulically-actuated speed selector, a source of power for the headstock, a main clutch therefor, a selector valve movable to various positions in order to select the desired speed and means for delivering fluid pressure to said valve, said means including a pump actuated by a motor, and means controlled by said clutch to actuate said pump by said motor, said means including a motor control device.

10. In a machine tool headstock, including an hydraulically-actuated speed selector, a source of power for the headstock, a main clutch therefor, a selector valve movable to various positions in order to select the desired speed and means for delivering fluid pressure to said valve, said means including a pump actuated by a motor, and means controlled by said clutch to actuate said pump by said motor, said means including a centrifugally-responsive device.

11. In a machine tool headstock, including an hydraulically-actuated speed selector, including shafts, a selector valve movable to various positions in order to select the desired speed of said shafts and means for delivering fluid pressure to said valve, said means including a pump controlled by the actuation of one of the shafts in the headstock.

12. In a machine tool headstock, including an hydraulically-actuated speed selector, including shafts, a selector valve movable to various positions in order to select the desired speed of said shafts and means for delivering fluid pressure to said valve, said means including a pump actuated by a motor controlled by actuation of one of the shafts in the headstock.

13. In a machine tool headstock, including an hydraulically-actuated speed selector, including shafts, a selector valve movable to various positions in order to select the desired speed of said shafts and means for delivering fluid pressure to said valve, said means including a pump actuated by a motor, and means controlled by one of the shafts in said headstock to actuate said pump by said motor.

14. In a machine tool headstock, including an hydraulically-actuated speed selector, including shafts, a selector valve movable to various positions in order to select the desired speed of said shafts and means for delivering fluid pressure to said valve, said means including a pump actuated by a motor, and means controlled by one of the shafts in said headstock to actuate said pump by said motor, said means including a motor control device.

15. In a machine tool headstock, including an hydraulically-actuated speed selector, including shafts, a selector valve movable to various positions in order to select the desired speed of said shafts and means for delivering fluid pressure to said valve, said means including a pump actuated by a motor, and means controlled by one of the shafts in said headstock to actuate said pump by said motor, said means including a centrifugally-responsive device.

EDWARD C. BULLARD.